(12) United States Patent
Prati (10) Patent No.: US 11,002,543 B2
(45) Date of Patent: May 11, 2021

(54) MEMS GYROSCOPE WITH REGULATION OF THE MISMATCH BETWEEN THE DRIVING AND SENSING FREQUENCIES

(71) Applicant: STMicroelectronics S.r.l., Agrate Brianza (IT)

(72) Inventor: Daniele Prati, Catania (IT)

(73) Assignee: STMICROELECTRONICS S.R.L., Agrate Brianza (IT)

( * ) Notice: Subject to any disclaimer, the term of this patent is extended or adjusted under 35 U.S.C. 154(b) by 297 days.

(21) Appl. No.: 16/116,511

(22) Filed: Aug. 29, 2018

(65) Prior Publication Data

US 2019/0072389 A1 Mar. 7, 2019

(30) Foreign Application Priority Data

Sep. 5, 2017 (IT) .......................... 102017000099412

(51) Int. Cl.
*G01C 19/5712* (2012.01)
*G01C 19/5733* (2012.01)
*G06F 12/0817* (2016.01)

(52) U.S. Cl.
CPC ..... *G01C 19/5712* (2013.01); *G01C 19/5733* (2013.01); *G06F 12/0817* (2013.01)

(58) Field of Classification Search
CPC ............ G01C 19/5733; G01C 19/5726; G01C 19/5712; G01C 19/5719; G01C 19/56; G06F 12/0817
USPC ...................................................... 73/514.18
See application file for complete search history.

(56) References Cited

U.S. PATENT DOCUMENTS

| | | | | |
|---|---|---|---|---|
| 9,404,747 | B2 * | 8/2016 | Valzasina | G01C 19/5712 |
| 2005/0166675 | A1 * | 8/2005 | Hobbs | G01C 19/5719 |
| | | | | 73/504.12 |
| 2010/0023695 | A1 | 1/2010 | Guthrie et al. | |
| 2010/0116050 | A1 * | 5/2010 | Wolfram | G01C 19/574 |
| | | | | 73/504.12 |
| 2010/0206071 | A1 * | 8/2010 | Rocznik | G01C 19/574 |
| | | | | 73/504.12 |
| 2011/0018068 | A1 * | 1/2011 | Depetro | H01L 21/823814 |
| | | | | 257/369 |
| 2013/0298670 | A1 | 11/2013 | Tsugai et al. | |

(Continued)

FOREIGN PATENT DOCUMENTS

| | | | |
|---|---|---|---|
| JP | 2005241500 A | * | 9/2005 |
| WO | 9745699 A2 | | 12/1997 |
| WO | 2010096306 A1 | | 8/2010 |

OTHER PUBLICATIONS

Machine Translation of JP-2005241500-A (Year: 2020).*

*Primary Examiner* — David L Singer
(74) *Attorney, Agent, or Firm* — Slater Matsli, LLP (57) ABSTRACT

A MEMS gyroscope can include a supporting structure and a mobile mass elastically suspended from the supporting structure in a driving direction and in a sensing direction, mutually perpendicular. A driving structure is coupled to the mobile mass for controlling a driving movement of the mobile mass in the driving direction at a driving frequency. A driving-frequency tuning electrode, distinct from the driving structure, faces the mobile mass. A driving-frequency tuner electrically coupled to the driving-frequency tuning electrode for supplying a tuning voltage to the driving-frequency tuning electrode.

22 Claims, 6 Drawing Sheets

(56) References Cited

U.S. PATENT DOCUMENTS

2015/0377624 A1\* 12/2015 Falorni .............. G01C 19/5712
73/504.12

\* cited by examiner

Fig.13

MEMS GYROSCOPE WITH REGULATION OF THE MISMATCH BETWEEN THE DRIVING AND SENSING FREQUENCIES

CROSS-REFERENCE TO RELATED APPLICATIONS

This application claims priority to Italian Patent Application No. 102017000099412, filed on Sep. 5, 2017, which application is hereby incorporated herein by reference.

TECHNICAL FIELD

The present invention relates to a MEMS gyroscope with regulation of the mismatch between the driving frequency and the sensing frequency.

BACKGROUND

As is known, MEMS (Micro-Electro-Mechanical Systems) are increasingly used in various applications, due to their small dimensions, costs compatible with consumer applications, and their growing reliability. In particular, using this technology, inertial sensors, such as microintegrated gyroscopes and electro-mechanical oscillators, are produced.

MEMS devices of this type generally comprise a supporting body and at least one mobile mass, suspended over the supporting body and coupled thereto through springs, or "flexures". The springs are configured to enable the mobile mass to oscillate with respect to the supporting body according to one or more degrees of freedom. In MEMS devices with driving and sensing of a capacitive type, the mobile mass is capacitively coupled to a plurality of fixed electrodes, which are fixed with respect to the supporting body, thus forming capacitors with variable capacitance. When the MEMS device operates as a sensor, movement of the mobile mass with respect to the fixed electrodes, due to the action of forces acting thereon, varies the capacitance of the capacitors. By measuring this variation, it is possible to detect the displacement of the mobile mass with respect to the supporting body, and on the basis of the displacement it is possible to detect various parameters associated to the force that has caused the displacement (for example, the amplitude). Instead, when the MEMS device operates as actuator, suitable biasing voltages are applied between the mobile mass and the supporting body, for example through driving electrodes. The mobile mass is thus subject to an electrostatic force that causes the desired movement thereof.

Among MEMS sensors, gyroscopes, in particular, have a complex electro-mechanical structure, which typically comprises at least two masses that are mobile with respect to the supporting body, coupled to each other so as to have a number of degrees of freedom that depends upon the architecture of the system. In the majority of cases, each mobile mass has one or at the most two degrees of freedom. The mobile masses are capacitively coupled to the supporting body through sensing electrodes and through driving electrodes.

In an embodiment with two mobile masses, a first mobile mass is dedicated to driving and is kept in oscillation at the resonance frequency at a controlled oscillation amplitude. The second mobile mass is driven through the first mobile mass with oscillatory (translational or rotational) motion and, in the case of rotation of the microstructure about a gyroscope axis at an angular velocity, is subject to a Coriolis force proportional to the angular velocity and perpendicular to the driving direction. In practice, the second (driven) mobile mass acts as an accelerometer that enables detection of the Coriolis force and detection of the angular velocity.

In another embodiment, a single mobile mass is coupled to the supporting body and is able to move with respect to the latter with two independent degrees of freedom. In this case, one degree of freedom is used for driving and one degree of freedom is used for sensing. This latter degree of freedom may allow a movement in the mobile mass plane (in-plane movement) or a movement perpendicular to this plane (out-of-plane movement). A driving device keeps the mobile mass in controlled oscillation according to the driving degree of freedom, and the mobile mass moves based on the sensing degree of freedom, in response to rotation of the supporting body due to the Coriolis force.

SUMMARY

Embodiments of the present invention provide a gyroscope that overcomes drawbacks of the prior art. For example, a gyroscope of one embodiment can enable regulation or tuning of the driving frequency to adapt the frequency mismatch to the needs.

According to the present invention, there are provided a MEMS gyroscope and a method for controlling a MEMS gyroscope.

For example, a MEMS gyroscope can include a supporting structure and a mobile mass elastically suspended from the supporting structure in a driving direction and in a sensing direction, mutually perpendicular. A driving structure is coupled to the mobile mass for controlling a driving movement of the mobile mass in the driving direction at a driving frequency. A driving-frequency tuning electrode, distinct from the driving structure, faces the mobile mass. A driving-frequency tuner electrically coupled to the driving-frequency tuning electrode for supplying a tuning voltage to the driving-frequency tuning electrode.

Another embodiment provides a method for controlling a MEMS gyroscope, with the steps of driving a mobile mass in a driving direction and at a driving frequency by a driving structure, detecting a movement of the mobile mass in a sensing direction, perpendicular to the driving direction, by a sensing structure, and biasing a driving-frequency tuning electrode, distinct from the driving structure and facing the mobile mass, at a tuning voltage.

In practice, the present MEMS gyroscope comprises a structure for adjusting the frequency mismatch by regulating the driving frequency. In particular, the structure for adjusting the mismatch comprises parallel-plate capacitive elements, preferably formed in non-used areas of the mobile masses of the gyroscope. The parallel-plate capacitive elements are each formed by a fixed tuning electrode facing a respective mobile mass, in particular projecting in an opening of the mobile mass. The fixed electrodes are advantageously biased all at a same tuning voltage.

BRIEF DESCRIPTION OF THE DRAWINGS

For a better understanding of the present invention, a preferred embodiment thereof is now described, purely by way of non-limiting example, with reference to the attached drawings, wherein.

DETAILED DESCRIPTION OF ILLUSTRATIVE EMBODIMENTS

Figure 1:
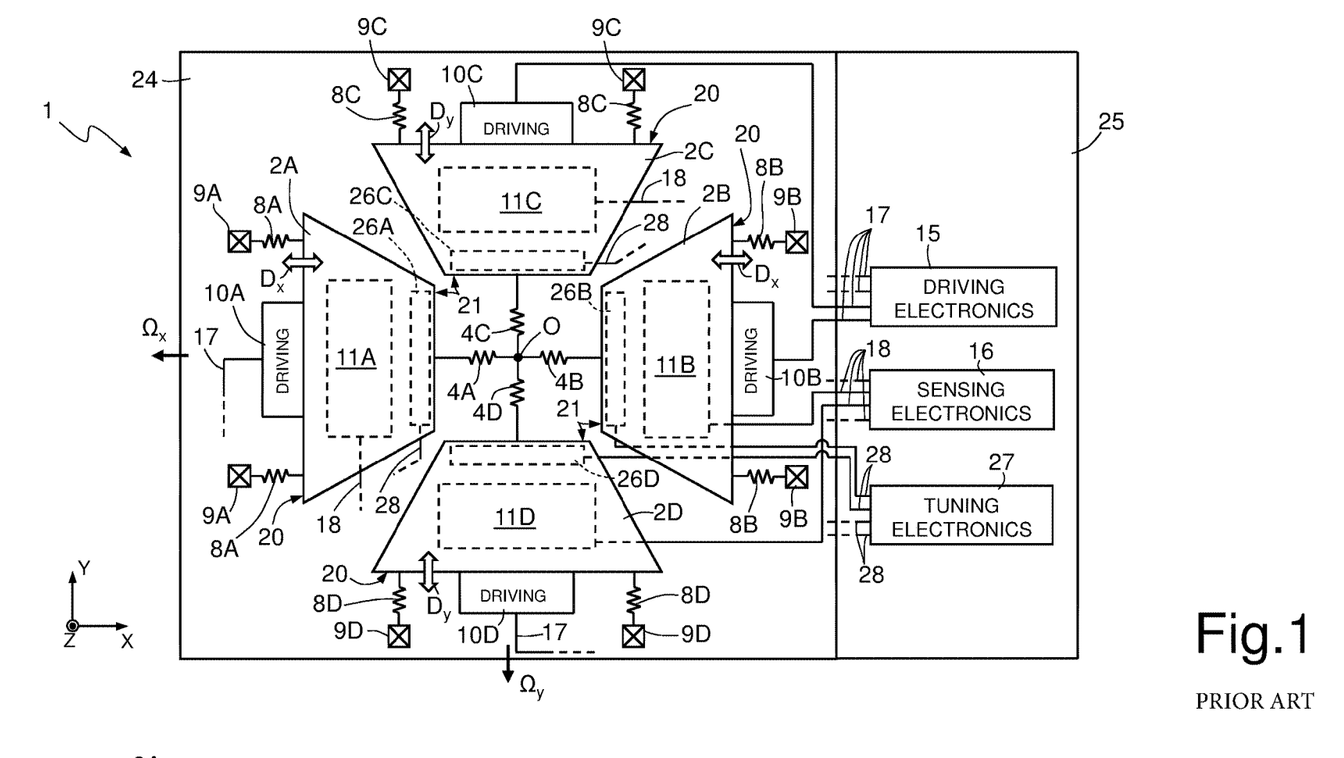
FIG. 1 is a simplified top plan view of a known MEMS gyroscope.
Figure 2:
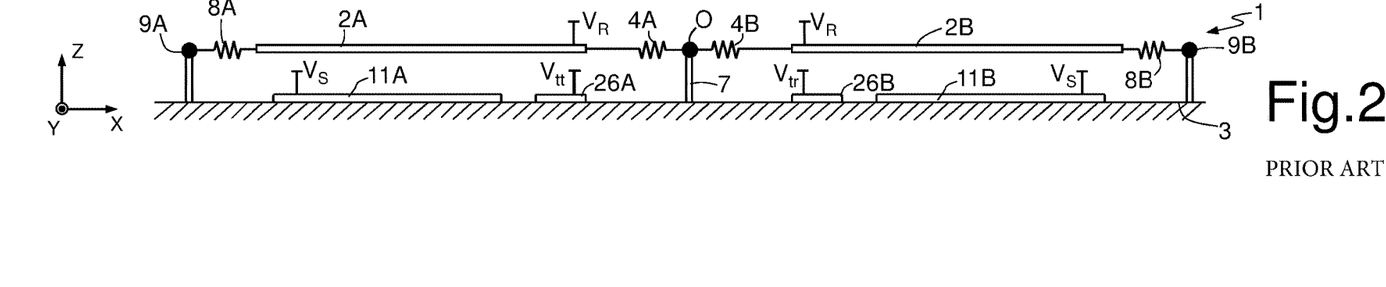
FIG. 2 is a simplified cross-section of the gyroscope of FIG. 1.

FIGS. 1 and 2 for example schematically show the structure of a gyroscope 1 of the type with single mobile mass manufactured using the MEMS technology.

In detail, the gyroscope 1 comprises two pairs of mobile masses 2A-2B, 2C-2D suspended over a substrate 3 (FIG. 2) defining a plane parallel to a first Cartesian axis, here the axis X, and to a second Cartesian axis, here the axis Y. The mobile masses 2A, 2B, 2C, 2D here have a generally trapezoidal shape, with a respective long side 20 and a respective short side 21, and are each arranged at 90° with respect to the adjacent mobile masses; thereby the respective long sides 20 extend along the sides of a first square or rectangle and their short sides 21 extend along the sides of a second square or rectangle, internal to the first square or rectangle and concentric thereto. In practice, the short sides 21 surround a central point O that is a center of symmetry for the gyroscope 1. In particular, two mobile masses 2A, 2B (first pair of mobile masses) have respective long sides 20 and short sides 21 parallel to the second axis Y and are arranged specularly with respect to a straight line passing through the central point O and parallel to the second axis Y; two mobile masses 2C, 2D (second pair of mobile masses) have respective long sides 20 and short sides 21 parallel to the first axis X and are arranged specularly with respect to a straight line passing through the central point O and parallel to the first axis X.

The mobile masses 2A-2D are supported by a supporting structure, which is fixed with respect to the substrate 3 and enables movement of the mobile masses 2A-2D according to two degrees of freedom. In detail, the supporting structure (illustrated only schematically in FIGS. 1 and 2) has first elastic elements 4A-4D extending between the short sides 21 of the mobile masses 2A-2D and the central point O, where an anchoring pillar 7 extends (FIG. 2); and second elastic elements 8A-8D, extending between the long sides 20 of the mobile masses 2A-2D and respective anchorage points 9A-9D.

The elastic elements 4A-4D and 8A-8D (also referred to as springs, or "flexures") are here configured to allow a driving movement of the mobile masses 2A, 2B along the first axis X (arrows Dx) and a first sensing movement (due to the Coriolis force originated by a rotation of the gyroscope 1 about the second axis Y) along a third Cartesian axis, here the vertical axis Z; and a driving movement of the mobile masses 2C, 2D along the second axis Y (arrows Dy) and a second sensing movement (due to the Coriolis force originated by a rotation of the gyroscope 1 about the first axis X) along the vertical axis Z.

If the gyroscope 1 is of a triaxial type, the elastic elements 4A-4D and 8A-8D may allow a third movement of at least one pair of mobile masses 2A-2B, 2C-2D, for example the second pair of mobile masses 2C-2D, along the first axis X for detecting Coriolis forces acting along the vertical axis Z, in a per se known manner.

To this end, each mobile mass 2A-2D is coupled to a respective driving structure 10A-10D, for example of a comb capacitive type, of a known type, arranged on the long sides 20 or within suitable windows formed in the mobile masses 2A-2D.

Each mobile mass 2A-2D is capacitively coupled to sensing electrodes here arranged on the substrate 3, underneath the respective mobile masses 2A-2D, as represented by a dashed line in FIG. 1 and illustrated in FIG. 2 for the mobile masses 2A, 2B. In particular, sensing electrodes 11A, 11B, for example of monocrystalline or polycrystalline silicon, are capacitively coupled to the mobile masses 2A, 2B, of monocrystalline or polycrystalline silicon, for sensing the relative movement, parallel to the vertical axis Z, in response to an angular velocity $\Omega_y$ about the second axis Y (roll velocity).

Likewise, sensing electrodes 11C, 11D, illustrated with a dashed line in FIG. 1, are here arranged on the substrate 3, underneath the mobile masses 2C, 2D, and are capacitively coupled thereto, for sensing the relative movement, parallel to the vertical axis Z, in response to an angular velocity $\Omega_x$ about the second axis X (pitch velocity).

FIGS. 1 and 2 do not show further sensing electrodes that may be provided within suitable windows formed, for example, in the mobile masses 2C-2D, for sensing a relative movement along the first axis X in response to an angular velocity $\Omega z$ about the vertical axis Z (yaw velocity), in case of a gyroscope 1 of a triaxial type.

The driving structures 10A-10B are coupled to a driving-control unit 15 through respective connection lines 17 illustrated schematically. The sensing electrodes 11A-11D (as likewise possible further yaw sensing electrodes) are coupled to a sensing-control unit 16 through respective connection lines 18, also illustrated schematically.

The gyroscope 1 is here represented integrated in a first chip 24 comprising the substrate 3 and a structural layer arranged on top of the substrate 3, for example of polycrystalline silicon; the mobile masses 2A-2D, the elastic elements 4A-4D and 8A-8D, and the driving structures 10A-10D are formed in this structural layer, using known techniques of photolithographic definition and selective etching, in a per se known manner. The driving-control unit 15 and the sensing-control unit 16 are generally integrated in a second chip 25, for example an ASIC (Application-Specific Integrated Circuit), performing signal processing and filtering, in addition to control operations.

In use, the mobile masses 2A-2D are generally biased at a same rotor voltage $V_R$, the fixed electrodes (not shown) of the driving structures are biased at a.c. driving voltages $V_A$, and the sensing electrodes 11A-11D are biased at sensing voltages $V_S$.

Figure 3:
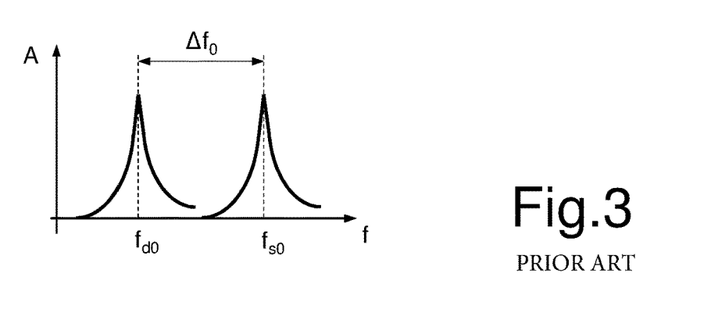
FIG. 3 illustrates the mismatch existing in a known MEMS gyroscope.

In real gyroscopes, the mobile masses 2A-2D has a driving resonance frequency $f_A$. The driving resonance frequency $f_A$ depends upon the geometrical characteristics of the gyroscope 1 and has a spread due to asymmetries and unbalancing in the structure. Further, the mobile masses 2A-2D also has a sensing resonance frequency $f_S$, which is generally different from the driving resonance frequency $f_A$ and is also subject to spread. The difference between the driving resonance frequency $f_A$ and the sensing resonance frequency $f_S$ is usually referred to as mismatch ($\Delta f_o$) and, due to the spread of the driving and sensing resonance frequencies, is in turn subject to spread, as illustrated in FIG. 3, which illustrates the amplitude A of the driving and sensing oscillations as a function of the frequency f.

The spread of the mismatch is undesired; furthermore, it is desirable to control the theoretical degree of mismatch. In fact, low values of mismatch cause greater detection sensitivity, higher gain, and lower noise levels, but a lower stability, and are preferred for consumer applications, whereas high values of mismatch enable a better stability and are generally preferred for applications in the automotive sector.

Solutions have thus already been proposed for controlling the frequency mismatch. A known solution consists, for example, in providing further electrodes for modifying the sensing frequency. This solution is illustrated in FIGS. 1 and 2 described above as regards control of the sensing frequency in two directions.

Here, a tuning electrode 26A-26D is associated to each mobile mass 2A-2D and, more precisely (as represented by the dashed lines of FIG. 1 and more clearly visible in FIG. 2 for the mobile masses 2A and 2B), is arranged on the substrate 3, underneath the respective mobile mass, adjacent to the sensing electrodes. The tuning electrodes 26A-26D are, for example, of monocrystalline or polycrystalline silicon and are capacitively coupled to the respective mobile masses 2A-2D to form parallel-plate capacitors therewith.

Similar electrodes for tuning the yaw sensing frequency (not illustrated) are in general provided for the vertical axis Z.

The electrodes 26A-26D for tuning the sensing frequency, as any other yaw tuning electrodes) are biased in pairs through a suitable tuning control unit 27, integrated in the second chip 25 and connected to the tuning electrodes 26A-26D through connection lines 28. In particular, the roll tuning electrodes 26A-26B are biased at a roll tuning voltage $V_{tr}$, the pitch tuning electrodes 26C, 26D are biased at a pitch tuning voltage $V_{tp}$, and possible yaw tuning electrodes (not illustrated) are biased at a yaw tuning voltage $V_{ty}$.

The presence of the electrodes 26A-26D for tuning the sensing frequency determines a variation of the sensing frequency along the various axes. In particular, the modified sensing frequency $f'_{sr/p/y}$, expressed in Hz, is given by:

$$f'_{sr/p/y} = \frac{1}{2\pi}\sqrt{\frac{K_m - K_s K_t}{J}} \text{ [Hz]} \tag{1}$$

where J is the polar moment of inertia of the mobile masses 2A-2D that are each time active with respect to the considered sensing direction (for example, the mobile masses 2A and 2B for roll movement and the mobile masses 2C and 2D for pitch movement), $K_m$ is the constant of mechanical stiffness of the masses 2A-2D that are each time active with respect to the considered sensing direction, $K_s$ is the electrostatic elastic constant due to the differential voltage $V_R-V_S$ applied between the mobile masses 2A-2D and the sensing electrodes 11A-11D, and $K_t$ is the electrostatic elastic constant due to the differential voltage $V_R-V_t$ applied between the mobile masses 2A-2D and the tuning electrodes 26A-26D, where $V_t$ is, each time, $V_{tp}$, $V_{tr}$, or $V_{ty}$.

In turn, the electrostatic elastic constant $K_s$ and the electrostatic elastic constant $K_t$, which are expressed in N/m, are given by:

$$K_s = -2\varepsilon_0 \frac{A_e}{a_g^3}[(V_R - V_S)^2]\left[\frac{N}{m}\right] \tag{2}$$

$$K_t = -2\varepsilon_0 \frac{A_e}{a_g^3}[(V_R - Vt)^2]\left[\frac{N}{m}\right] \tag{3}$$

where $A_e$ is the area of each tuning electrode 26A-26D, $a_g$ is the distance in the vertical direction (parallel to the vertical axis Z) between each mobile mass 2A-2D and the respective tuning electrode 26A-26D (air gap), $\varepsilon_o$ is the vacuum electrostatic constant, $V_R$ is the voltage applied to the mobile masses 2A-2D, $V_S$ is the voltage applied to the sensing electrodes 11A-11D (the same for all), and $V_t$ is the voltage applied to the pairs of tuning electrodes 26A-26D (each time, $V_{tp}$, $V_{tr}$, or $V_{ty}$).

Figure 4:
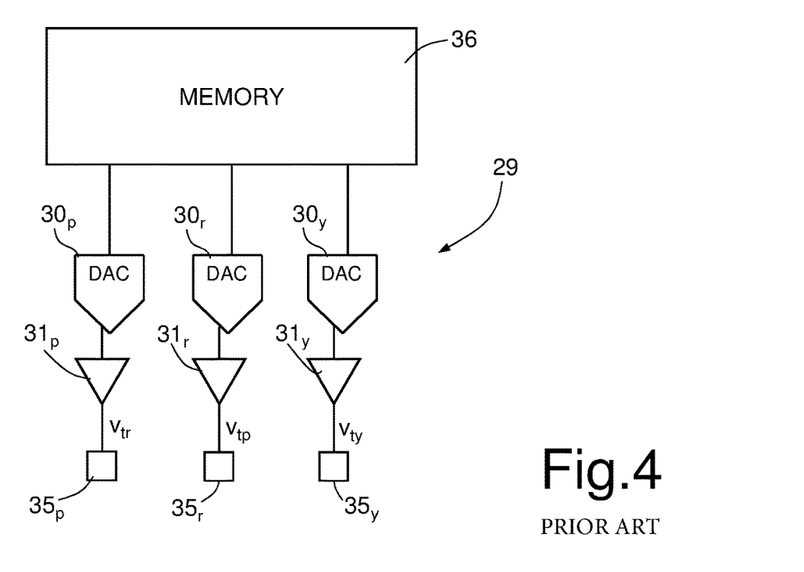
FIG. 4 schematically shows a tuning biasing circuit used with the gyroscope of FIG. 1.
Figure 5:
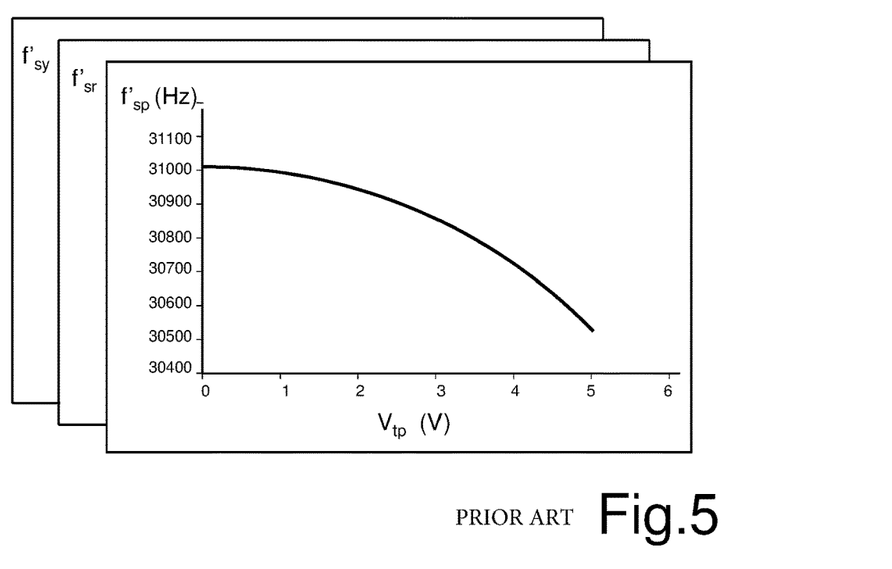
FIG. 5 schematically shows a structure for storing settings for the biasing circuit of FIG. 4.

The above solution is not optimal since it has a high impact on the occupied area, it requires quite a lot of additional space and entails a considerable power consumption. In fact, the pitch and roll tuning electrodes 26A-26D and possible yaw tuning electrodes (not illustrated) require potentially different biasing voltages and thus need separate biasing structures, as illustrated, for example, in FIG. 4. Here, a tuning biasing circuit 29 comprises three digital-to-analog converters (DACs) 30r, 30p, 30y, one for each movement direction, each in turn connected to a respective buffer 31r, 31p, 31y and to a respective contact pad 35r, 35p, and 35y. Each contact pad 35r, 35p, and 35y is connected to a respective pair of tuning electrodes (roll tuning electrodes 26A-26B, pitch tuning electrodes 26C-26D, and yaw tuning electrodes, here designated by 26E-26F). The tuning biasing circuit 29 is connected to a memory 36, which stores voltage-tuning values, one for each sensing direction of the mobile masses 2A-2D. The memory 36 stores the voltage-tuning values $V_{tr}$, $V_{tp}$, $V_{ty}$ on the basis of desired parameters (typically the modified sensing frequency $f'_{sr/p/y}$), for example in the form of tables, as illustrated in FIG. 5. For instance, the tables of FIG. 5 may be stored in the second chip 25 of FIG. 1 and used by the tuning control unit 27 for biasing each pair of tuning electrodes 26A-26B, 26C-26D and 26E-26F at the respective tuning voltage $V_{tr}$, $V_{tp}$, $V_{ty}$, which corresponds to the desired value of frequency mismatch, for each direction of movement (roll, pitch, and yaw).

A different type of tuning is, for example, described in WO 2010/096306, and comprises a structure for tuning the driving frequency through an auxiliary biasing structure, coupled to the mobile masses through nonlinear springs. The auxiliary biasing structure, of a comb-drive type, has the aim of modifying the state of stress of the nonlinear springs upon command by a control circuit and does not have a direct effect on the position of the suspended masses. In addition, this solution is, however, not optimal since it also has a high impact on the area and entails high consumption levels. Further, this type of solution modifies the linearity of the springs, and this may lead to a reduction in the stability of the device, which is undesirable in certain applications.

Figure 6:
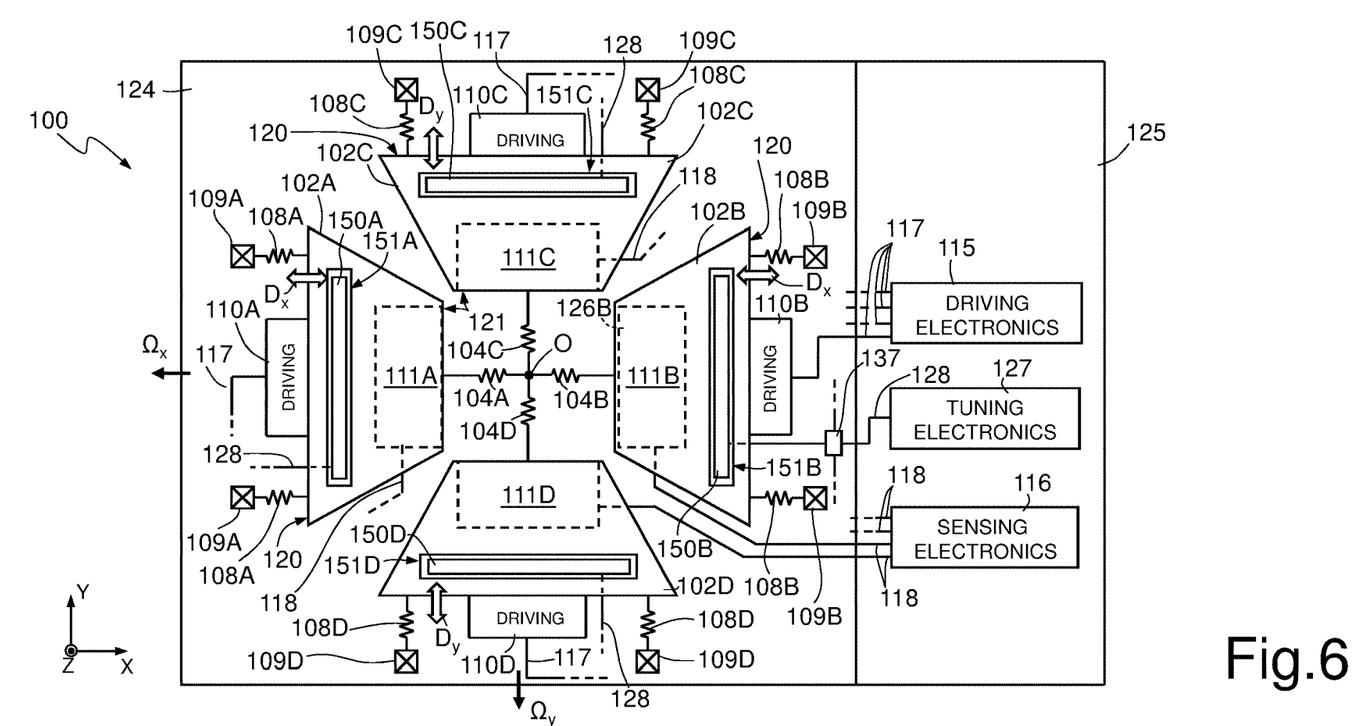
FIG. 6 is a simplified top plan view of one embodiment of the present MEMS gyroscope.
Figure 7:
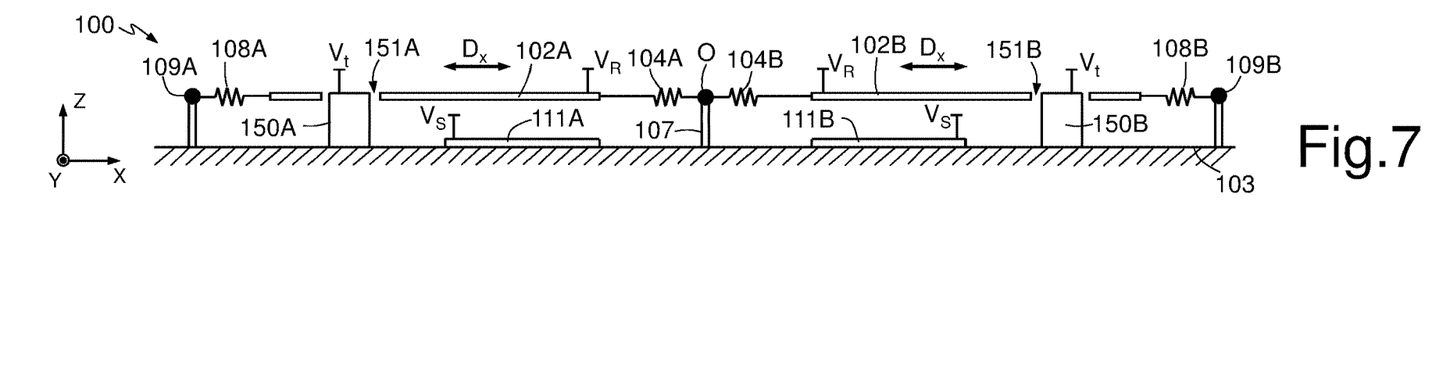
FIG. 7 is a simplified cross-section of the gyroscope of FIG. 6.

FIG. 6 is a simplified top plan view of one embodiment of the present MEMS gyroscope 100 and FIG. 7 is a simplified cross-section of the gyroscope 100 of FIG. 6. The gyroscope 100 has a general structure similar to the gyroscope 1 of FIG. 1, so that similar parts are designated by the same reference numbers increased by 100 and same parts are not described in detail.

The gyroscope 100 is here integrated in a first chip 124 and in a second chip 125. In particular, the first chip 124 houses four mobile masses 102A, 102B, 102C, 102D suspended over a substrate 103 (FIG. 7). In practice, an air gap 106 extends between the mobile masses 102A-102D and the substrate 103. The mobile masses 102A-102D have a generally trapezoidal shape, have a respective long side 120 and a respective short side 121, and are each arranged at 90° with respect to the adjacent mobile masses.

The mobile masses 102A-102D are supported above the substrate 103 through a supporting structure formed by first elastic elements 104A-104D and second elastic elements 108A-108D. The elastic elements 104A-104B and 108A-108B are here configured to allow a driving movement of the respective mobile masses 102A, 102B along a first axis X (arrows Dx) and a sensing movement (in response to an angular velocity $\Omega y$ about a second axis Y—roll velocity) along a vertical axis Z. The elastic elements 104C-104D and 108C-108D are configured to allow a driving movement of the mobile masses 102C, 102D along the second axis Y (arrows Dy) and a sensing movement (in response to an angular velocity $\Omega x$ about the first axis X—pitch velocity) along the vertical axis Z.

Each mobile mass 102A-102D is coupled to a respective driving structure 110A-110D, for example of a known comb capacitive type, arranged on the long sides 120 or within suitable windows provided in the mobile masses 102A-102D.

Furthermore each mobile mass 102A-102D is capacitively coupled to sensing electrodes 111A-111D arranged on the substrate 103, underneath the respective mobile masses 102A-102D, as indicated by a dashed line in FIG. 6 and illustrated in FIG. 7 for the mobile masses 102A, 102B. In the illustrated embodiment, the sensing electrodes 111A-111D are arranged in proximity of the short sides 121 of the respective mobile masses 102A-102D.

Also in FIGS. 6 and 7, the gyroscope 100 may comprise further sensing electrodes (not illustrated), which may be provided within suitable windows formed, for example, in the mobile masses 102C-102D, for sensing a relative movement along the first axis X in response to an angular velocity $\Omega z$ about the vertical axis Z—yaw velocity, in case of an embodiment of the gyroscope 100 of a triaxial type.

The driving structures 110A-110D are coupled to a driving-control unit 115 through respective connection lines 117 illustrated schematically. The sensing electrodes 111A-111D (as likewise possible further yaw sensing electrodes) are coupled to a sensing-control unit 116 through respective connection lines 118, which are also illustrated schematically. The driving-control unit 115 and the sensing-control unit 116 may be integrated in the second chip 125, for example an ASIC (Application-Specific Integrated Circuit), which may comprise further circuits and structures for carrying out signal-processing and filtering operations, in addition to control operations.

The gyroscope 100 has a structure for regulating the driving frequency. In particular, the structure for regulating the driving frequency comprises at least one parallel-plate, or parallel-electrode, capacitor for each mobile mass. Each parallel-plate capacitor is formed by a mobile plate and by a fixed plate facing each other and extending in a direction transverse to the plane XY and to the driving direction of the respective mobile mass 102A-102D. In the illustrated embodiment, the mobile plates are formed by the mobile masses 102A-102D, and the fixed plates are formed by as many fixed tuning electrodes 150A-150D, facing the respective mobile masses 102A-102D and biased, with respect to the mobile masses 102A-102D, to modify the driving frequency.

Further, according to an embodiment of the present gyroscope, all fixed tuning electrodes 150A-150D are biased at the same tuning voltage $V_t$. The tuning voltage $V_t$ is typically a DC voltage, having a maximum value equal to the rotor voltage $V_R$.

Figure 8:
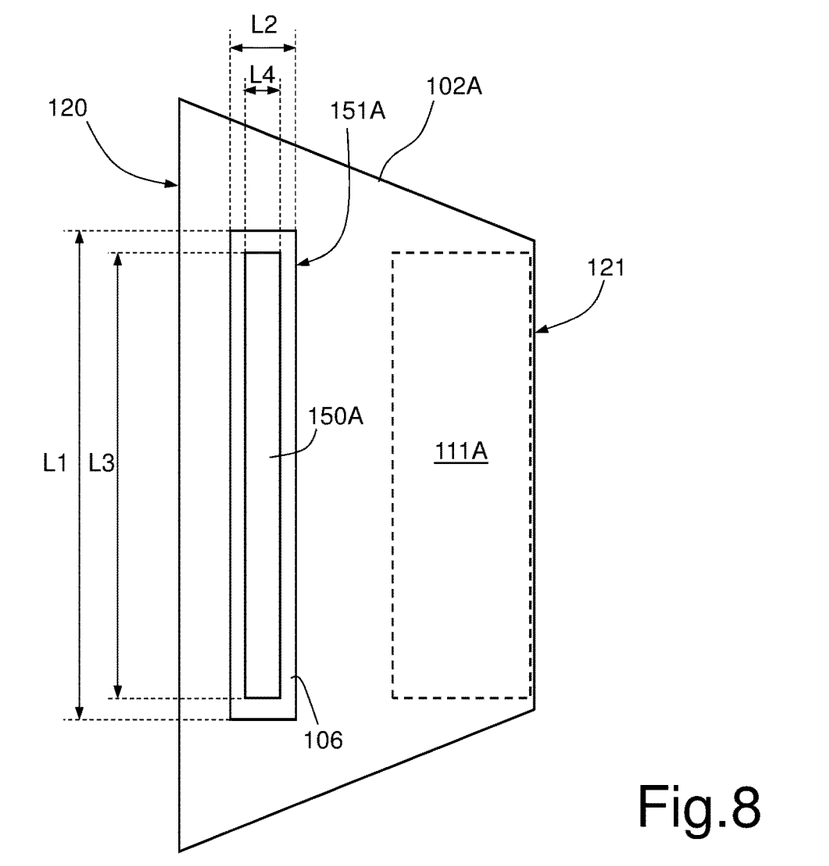
FIG. 8 is an enlarged top plan view of a suspended mass of the gyroscope of FIG. 6.
Figure 9:
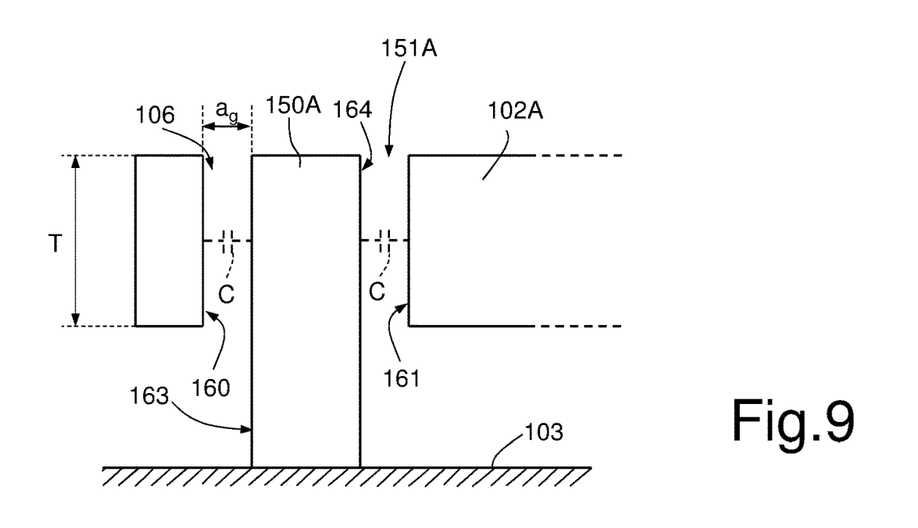
FIG. 9 is an enlarged cross-section of a portion of the suspended mass of FIG. 8.

In detail, as illustrated also in the enlarged views of FIGS. 8 and 9, each mobile mass 102A-102D has a respective through opening 151A-151D. For instance, the through openings 151A-151D have an elongated shape, substantially rectangular in top plan view (in a plane parallel to the Cartesian plane XY), and have a length L1 parallel to the long side 120 of the respective mobile mass 102A-102D and a width L2 perpendicular to the long side, with L1$\gg$L2. In this way, in top plan view, the through openings 151A, 151B in the mobile masses 102A, 102B have a shape elongated in a direction parallel to the second axis Y, and the through openings 151C, 151D in the mobile masses 102C, 102D have a shape elongated in a direction parallel to the first axis X. Further, each through opening 151A-151D has a height equal to the thickness of the mobile masses 102A-102D.

The fixed tuning electrodes 150A-150D in FIG. 6 extend from the substrate 103 as far as inside a respective through opening 151A-151D. In one embodiment, the top surface of the fixed tuning electrodes 150A-150D is aligned to the top surface of the mobile masses 102A-102D.

The fixed tuning electrodes 150A-150D are, for example, each formed by a wall of semiconductor material having a generally parallelepipedal shape, with a generally rectangular base similar to (but of smaller area than) the base of the respective openings 151A-151D. The fixed tuning electrodes 150A-150D of FIG. 6-9 thus have a length L3 perpendicular to the driving direction of the respective mobile mass 102A-102D, with L3<L1, and a width L4, with L4<L2 and L4$\ll$L3.

In practice, with reference to FIGS. 8-9, each opening 151A-151D is delimited by two main surfaces 160, 161 facing major sides 163, 164 of each fixed tuning electrode 150A-150D, and the main surfaces 160, 161 form, with the respective major side 163, 164 of the fixed tuning electrodes 150A-150D, two facing areas, having an area $A_e$=L3×T, where T is the thickness of the mobile masses 102A-102D. Thus, each fixed tuning electrode 150A-150D forms two capacitors C with the respective mobile mass 102A-102D (FIG. 9).

Each capacitor C has a capacitance depending upon the distance, or air gap, ag (FIG. 9) between the main surfaces 160, 161 of the openings 151A-151D and the respectively facing major sides 163, 164 of each fixed tuning electrode 150A-150D. Since the mobile masses 102A-102D move in the driving direction, the value of the air gap ag varies during operation. In particular, the value of the air gap ag at rest (with no driving), designated by ago, is chosen sufficiently large as to allow the movements of pitch and roll of the suspended masses 102A-102D without them coming into contact with the respective fixed tuning electrodes 150A-150D.

For instance, in an embodiment of the present MEMS device 100, the ratio between L1 and L2 (and between L3 and L4) is 10 to 20. In particular, L2 and L4 may be comprised between 10 and 40 µm, and L1 and L3 may be comprised 100 and 400 µm. The thickness T of the mobile masses 102A-102D may be comprised between 15 and 30 µm. Further, the value of the air gap ag at rest ago may be 7 µm, and the movement of pitch and roll may be at most 5 µm.

In this way, during operation, when for example the mobile mass 102A is driven with a roll movement in the first direction X, the distance between the facing surfaces of the opening 151A and the major sides of the fixed tuning electrode 150A varies between ago +Δx and ago −Δx (in the example referred to above, between 2 and 12 µm), accordingly modifying the capacitance of the capacitors C. In this situation, the capacitor C associated to the major side 163, 164 of the fixed electrode 150A arranged each time at a greater distance from the respective main surface 160, 161 (in the point of maximum, $a_g=a_{go}+\Delta x$) has a negligible effect, whereas the capacitor C on the opposite side (in the point of minimum, $a_g=a_{go}-\Delta x$) causes electrostatic softening, i.e., a reduction of the electrostatic elastic constant of the suspended mass 102A, as discussed hereinafter with reference to Eqs. (4) and (5).

Here the facing side parallel to the short sides of the openings 151A-151D, which is of no effect, is neglected.

Figure 10:
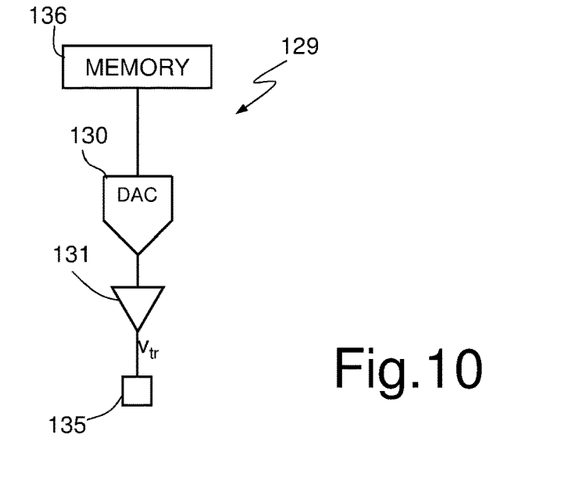
FIG. 10 schematically shows a tuning biasing circuit used with the gyroscope of FIGS. 6-7.

Since the fixed tuning electrodes 150A-150D are biased at a same tuning voltage $V_t$, the biasing circuit may be simplified, as illustrated in FIG. 10. Here, a biasing circuit 129 comprises a single digital-to-analog converter (DAC) 130 and a single buffer 131. The DAC 130, connected to a memory 136 and under the control of the tuning control unit 127 (FIG. 6), generates the tuning voltage $V_t$ supplied to the tuning electrodes 150A-150D through the connection line 128, a single output pad 135 on the second chip 125, and a single input pad 137 on the first chip 124. The value of the tuning voltage $V_t$ is, for example, stored in a single table of the type illustrated in FIG. 11; the table of FIG. 11 may further be stored in the second chip 125 of FIG. 6. In particular, the tuning control unit 127, on the basis of the user and/or design settings, reads the value of the tuning voltage $V_t$ corresponding to the value of the tuning frequency $f_t$ and thus of the desired frequency mismatch $\Delta f_o$, that is the same for each movement of roll, pitch, and yaw.

This solution thus enables a considerable saving of area both in the first and in the second chip 124, 125 and simplifies storage and reading in the second chip 125.

With the structure for regulating the driving frequency of FIG. 6-9, the gyroscope 100 has a driving frequency $f_{dt}$ $$f_{dt} = \frac{1}{2\pi}\sqrt{\frac{K_m - K_t}{J}} \qquad (4)$$

where J is the moment of inertia, $K_m$ is the constant of mechanical stiffness of the masses 102A-102D each time active with respect to the considered sensing direction, and $K_t$ is the electrostatic elastic constant due to the differential voltage $V_R-V_t$ applied between the mobile masses 102A-102D and the tuning electrodes 150A-150D, and is given by $$K_t = -2\varepsilon_0 \frac{A_e}{a_{g0}^3}[(V_R - Vt)^2] \qquad (5)$$

where $A_e$, $a_g o$, and $\varepsilon_o$ are, respectively, the facing area between each side of each mobile mass and the respective tuning electrode 150A-150D ($A_e=L3\times T$), the distance between the mutually facing surfaces 160-163 and 161-164 in the absence of stresses, and the vacuum dielectric constant.

Figure 11:
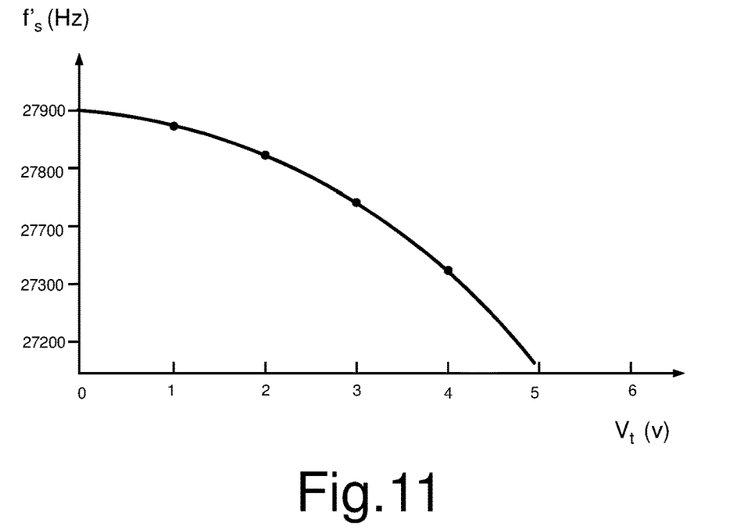
FIG. 11 schematically shows a setting storing structure for the biasing circuit of FIG. 10.
Figure 12A:
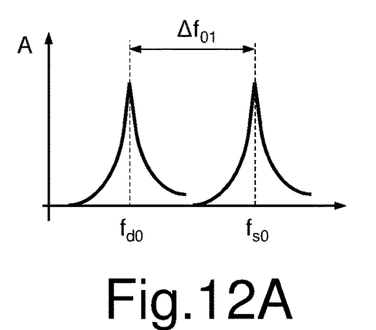
FIGS. 12A and 12B show the mismatch that may be regulated with the present MEMS gyroscope.
Figure 12B:
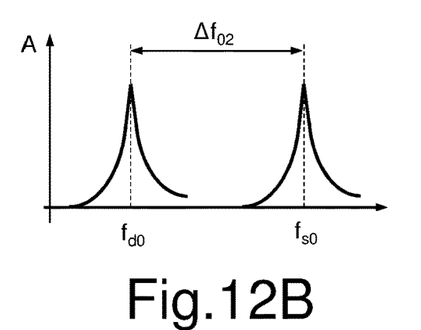

The possibility of modifying the tuning driving frequency on the basis of the table of FIG. 11 enables adjustment of the frequency mismatch $\Delta f_o$, according to the requirements, as shown also in FIGS. 12A and 12B, which illustrate, respectively, a situation of lower frequency mismatch $\Delta_{o1}$), and of higher frequency mismatch $\Delta_{o2}$.

Further, the gyroscope 100 is easier to calibrate than solutions performing a tuning of the sensing frequency.

Figure 13:
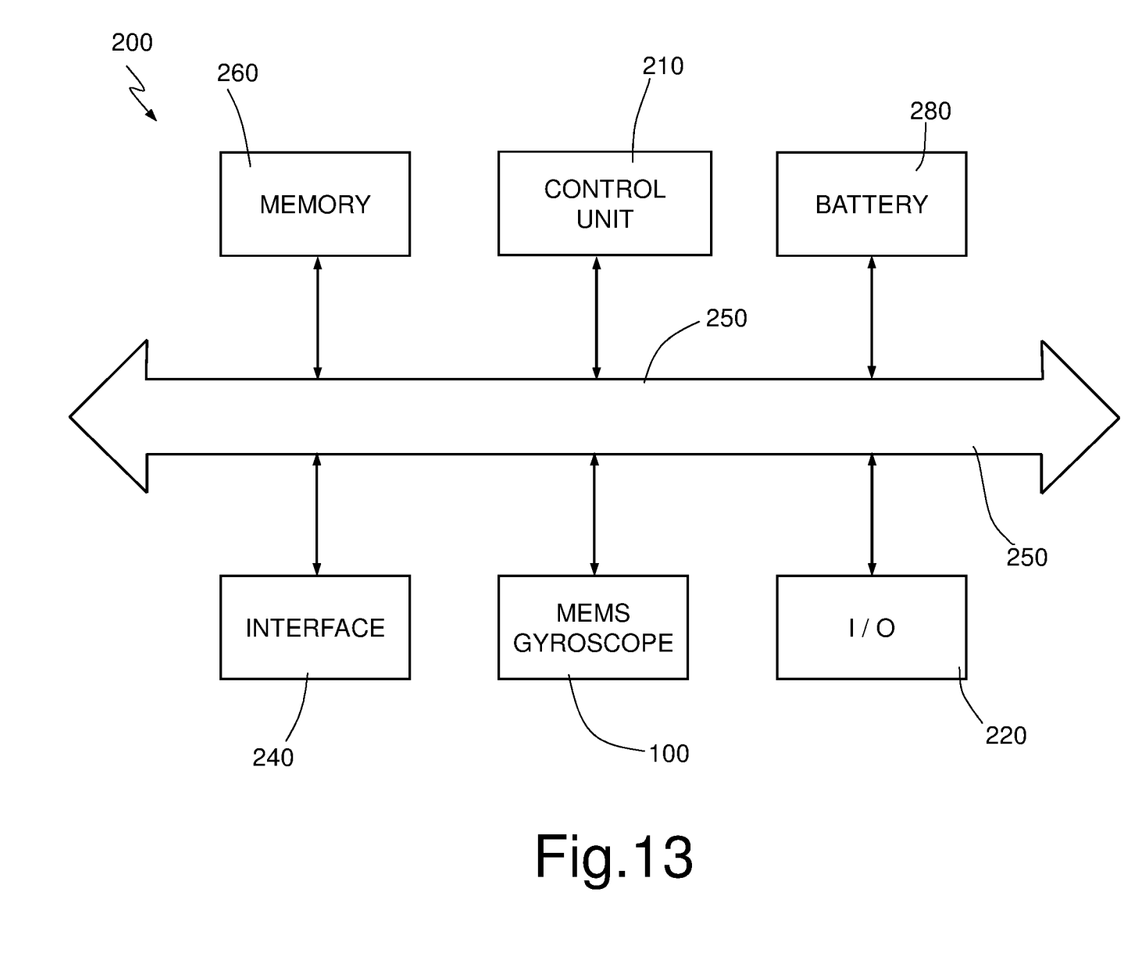
FIG. 13 shows a simplified block diagram of an electronic apparatus incorporating the present gyroscope.

FIG. 13 illustrates a portion of an electronic system 200 that incorporates the gyroscope 100 and may be used in apparatuses such as a palm-top computer (personal digital assistant, PDA), a lap-top computer or portable computer, possibly with wireless capacity, a cellphone, a messaging device, a digital music player, a digital camera, or other apparatuses designed to process, store, transmit, or receive information. For instance, the gyroscope 100 may be used in a digital camera for detecting movements and carrying out image stabilization. In a possible embodiment, the electronic device 200 is included in a motion-activated user interface for computers or consoles for video games. In a further embodiment, the electronic device 200 is incorporated in a satellite navigation device and is used for temporary tracking of position in the case of loss of the satellite positioning signal.

The electronic system 200 of FIG. 13 comprises a control unit 210, an input/output (I/O) unit 220 (for example, a keypad or a screen), the electronic device 200, a wireless interface 240, and a memory 260, of a volatile or nonvolatile type, coupled together through a bus 250.

The control unit 210 may comprise, for example, one or more microprocessors, microcontrollers, and the like. In a different embodiment, it may be formed by the second chip 125 of FIG. 6 and be an ASIC.

Further, the memory 260 may be internal to the control unit 210 and store the parameters and the quantities used for the operation of the gyroscope 100 to form the memory 136 of FIG. 11. In one embodiment, a battery 280 may be used for supplying the system 200. The electronic system 200 may, however, even comprise just some of the units illustrated in FIG. 13.

The I/O unit 220 may be used for generating a message. The electronic system 200 may use the wireless interface 240 for transmitting and receiving messages to and from a wireless communication network (not illustrated) with a radiofrequency (RF) signal. Examples of wireless interface may comprise an antenna, a wireless transceiver, such as a dipole antenna, even though the scope of the present invention is not limited thereto. Further, the I/O unit 220 may supply a voltage representing stored data either in the form of digital output (if digital information has been stored) and in the form of analog output (if analog information has been stored).

Finally, it is clear that modifications and variations may be made to the gyroscope described and illustrated herein, without thereby departing from the scope of the present invention, as defined in the attached claims. For instance, each fixed tuning electrode 150A-150D may be made up of different separate portions, biased in a same way. In this case, on the basis of the superposition principle, the area Ae indicated in Eq. (5) is equal to the sum of the facing areas of the various portions.

What is claimed is:

1. An MEMS gyroscope comprising:
   a supporting structure;
   a mobile mass elastically suspended from the supporting structure in a driving direction and in a sensing direction, the driving direction being mutually perpendicular to the sensing direction;

a driving structure coupled to the mobile mass and configured to control a driving movement of the mobile mass in the driving direction at a driving frequency;

a driving-frequency tuning electrode facing the mobile mass, the driving-frequency tuning electrode distinct from the driving structure; and a driving-frequency tuner electrically coupled to the driving-frequency tuning electrode and configured to supply a tuning voltage to the driving-frequency tuning electrode so as to cause a modified driving frequency $f_{dt}$, wherein the mobile mass is configured to be biased at a mobile voltage, and wherein the modified driving frequency $f_{dt}$ is proportional to the difference between the mobile voltage and the tuning voltage.

2. The MEMS gyroscope according to claim 1, wherein the driving-frequency tuning electrode and the mobile mass form a parallel-plate capacitor having plates extending perpendicular to the driving direction.

3. The MEMS gyroscope according to claim 1, wherein the mobile mass comprises a through opening, and the driving-frequency tuning electrode extends through the through opening.

4. The MEMS gyroscope according to claim 1, wherein the supporting structure comprises a substrate defining a plane, wherein the mobile mass is arranged at a distance from the substrate, and wherein the driving-frequency tuning electrode has the shape of an elongated wall extending from the substrate through the through opening.

5. The MEMS gyroscope according to claim 4, wherein the mobile mass has a thickness in a direction perpendicular to the plane, and the wall has a length in a direction perpendicular to the driving direction and parallel to the plane, the mobile mass and the wall having a facing area defined by the length and by the thickness.

6. The MEMS gyroscope according to claim 5, wherein the modified driving frequency $f_{dt}$ is:

$$f_{dt} = \frac{1}{2\pi}\sqrt{\frac{K_m - K_t}{J}} \ [Hz]$$

where J is a moment of inertia of the mobile mass, $K_m$ is the mechanical elastic driving constant of the mobile mass, and $K_t$ is the electrostatic elastic constant of the mobile mass, namely, $$K_t = -2\varepsilon_0 \frac{A_e}{a_{g0}^3}[(V_R - V_t)^2]$$

where $A_e$ is the facing area, $a_{go}$ is the distance at rest between facing surfaces of the through opening and of the driving-frequency tuning electrode in a direction perpendicular to the driving direction, $V_R$ is the mobile voltage, $V_t$ is the tuning voltage, and εo is the vacuum dielectric constant.

7. The MEMS gyroscope according to claim 1, further comprising a storage element configured to store values of the tuning voltage as a function of desired values of a modified driving frequency.

8. The MEMS gyroscope according to claim 7, wherein the mobile mass, the driving structure, and the driving-frequency tuning electrode are integrated in a first chip, and wherein the storage element and the driving frequency tuner are integrated in a second chip.

9. The MEMS gyroscope according to claim 1, further comprising a movement-sensing electrode capacitively coupled to the mobile mass and configured to detect movement of the mobile mass in the sensing direction.

10. The MEMS gyroscope according to claim 9, wherein the supporting structure comprises a substrate defining a plane, wherein the mobile mass is arranged at a distance from the substrate, wherein the driving-frequency tuning electrode has the shape of an elongated wall extending from the substrate through the through opening, and wherein the movement-sensing electrode extends over the substrate parallel to the plane, underneath the mobile mass, and laterally to the driving-frequency tuning electrode.

11. A system comprising:
a processing unit;
an interface coupled to the processing unit; and
the MEMS gyroscope according to claim 1, coupled to the processing unit.

12. A method for controlling a MEMS gyroscope, comprising:
driving a mobile mass in a driving direction and at a driving frequency by a driving structure;
detecting a movement of the mobile mass in a sensing direction that is perpendicular to the driving direction;
biasing the mobile mass at a mobile voltage; and
biasing a driving-frequency tuning electrode at a tuning voltage so as to cause a modified driving frequency $f_{dt}$ that is proportional to the difference between the mobile voltage and the tuning voltage, the driving-frequency tuning electrode distinct from the driving structure and facing the mobile mass, wherein the driving-frequency tuning electrode and the mobile mass form a parallel-plate capacitor having plates extending perpendicular to the driving direction.

13. The method for controlling according to claim 12, wherein the tuning voltage is a DC voltage.

14. The method for controlling according to claim 12, wherein biasing the driving-frequency tuning electrode comprises reading the tuning voltage in a table storing tuning voltage values as a function of desired driving-frequency values.

15. An MEMS gyroscope comprising:
a substrate defining a plane;
a mobile mass elastically suspended at a distance from the substrate in a driving direction and in a sensing direction, the driving direction being mutually perpendicular to the sensing direction, wherein the mobile mass comprises a through opening;
a driving structure coupled to the mobile mass;
a driving-frequency tuning electrode extending through the through opening of the mobile mass, the driving-frequency tuning electrode distinct from the driving structure, wherein the driving-frequency tuning electrode has the shape of an elongated wall extending from the substrate through the through opening; and
a driving-frequency tuner electrically coupled to the driving-frequency tuning electrode, wherein
the driving-frequency tuning electrode and the mobile mass form a parallel-plate capacitor having plates extending perpendicular to the driving direction, and
wherein the mobile mass is configured to be biased at a mobile voltage and the driving-frequency tuner is configured to supply the driving-frequency tuning electrode with a tuning voltage so as to cause a modified driving frequency $f_{dt}$ that is proportional to the difference between the mobile voltage and the tuning voltage.

16. The MEMS gyroscope according to claim 15, wherein the mobile mass has a thickness in a direction perpendicular to the plane, and the wall has a length in a direction perpendicular to the driving direction and parallel to the plane, the mobile mass and the wall having a facing area defined by the length and by the thickness.

17. The MEMS gyroscope according to claim 16, wherein the modified driving frequency $f_{dt}$ is:

$$f_{dt} = \frac{1}{2\pi}\sqrt{\frac{K_m - K_t}{J}} \text{ [Hz]}$$

where J is a moment of inertia of the mobile mass, $K_m$ is the mechanical elastic driving constant of the mobile mass, and $K_t$ is the electrostatic elastic constant of the mobile mass, namely, $$K_t = -2\varepsilon_0 \frac{A_e}{a_{g0}^3}[(V_R - Vt)^2]$$

where $A_e$ is the facing area, $a_{go}$ is the distance at rest between facing surfaces of the through opening and of the driving-frequency tuning electrode in a direction perpendicular to the driving direction, $V_R$ is the mobile voltage, $V_t$ is the tuning voltage, and εo is the vacuum dielectric constant.

18. The MEMS gyroscope according to claim 15, wherein the driving structure is configured to control a driving movement of the mobile mass in the driving direction at the modified driving frequency.

19. The MEMS gyroscope according to claim 18, further comprising a storage element configured to store values of the tuning voltage as a function of desired values of a modified driving frequency.

20. The MEMS gyroscope according to claim 19, wherein the mobile mass, the driving structure, and the driving-frequency tuning electrode are integrated in a first chip, and wherein the storage element and the driving frequency tuner are integrated in a second chip.

21. The MEMS gyroscope according to claim 15, further comprising a movement-sensing electrode extending over the substrate parallel to the plane, underneath the mobile mass, and laterally to the driving-frequency tuning electrode.

22. The MEMS gyroscope according to claim 21, wherein movement-sensing electrode is configured to detect movement of the mobile mass in the sensing direction.

* * * * *